United States Patent
Liao

(10) Patent No.: US 12,404,891 B2
(45) Date of Patent: Sep. 2, 2025

(54) ENGAGING MODULE

(71) Applicant: Chen-Chieh Liao, Kaohsiung (TW)

(72) Inventor: Chen-Chieh Liao, Kaohsiung (TW)

( * ) Notice: Subject to any disclaimer, the term of this patent is extended or adjusted under 35 U.S.C. 154(b) by 336 days.

(21) Appl. No.: 18/302,116

(22) Filed: Apr. 18, 2023

(65) Prior Publication Data

US 2023/0375021 A1    Nov. 23, 2023

(30) Foreign Application Priority Data

May 17, 2022 (TW) ................................ 111205108

(51) Int. Cl.
*F16B 7/20* (2006.01)
(52) U.S. Cl.
CPC ..................... *F16B 7/20* (2013.01)
(58) Field of Classification Search
CPC .... F16M 13/022; F16M 13/00; A44C 5/2061; A44C 5/2076; A44C 5/2057; Y10T 403/7005; Y10T 403/7007; F16B 7/20
See application file for complete search history.

(56) References Cited

U.S. PATENT DOCUMENTS

| | | | | |
|---|---|---|---|---|
| 4,622,726 A * | 11/1986 | Nakamura | ........... | A44C 5/2057 24/663 |
| 4,982,581 A * | 1/1991 | Furuyama | .......... | A44C 17/0216 63/29.1 |
| 5,367,891 A * | 11/1994 | Furuyama | ............ | A44C 5/2057 63/3 |
| 5,513,622 A * | 5/1996 | Musacchia, Sr. | ..... | F41B 5/1426 403/349 |
| 5,741,084 A * | 4/1998 | Del Rio | ............ | A61B 17/1633 285/376 |
| 5,871,222 A * | 2/1999 | Webb | ....................... | B60D 1/52 403/348 |
| 6,640,398 B2 * | 11/2003 | Hoffman | ............... | A44C 5/2057 70/459 |
| 6,981,391 B2 * | 1/2006 | Suzuki | ................. | A44C 5/2076 63/3 |
| 7,523,527 B2 * | 4/2009 | Garber | ................ | A44C 5/2061 24/587.11 |
| 8,764,050 B2 * | 7/2014 | Baumgartner | ........ | B60R 21/261 280/730.2 |
| 11,454,341 B2 * | 9/2022 | Liu | ........................ | F16G 15/06 |

* cited by examiner

*Primary Examiner* — Daniel J Wiley
(74) *Attorney, Agent, or Firm* — Rosenberg, Klein & Lee

(57) ABSTRACT

An engaging module has a male engaging element and a female engaging element. The male engaging element is connected to the female engaging element and has a first casing, a first magnetic element disposed in the first casing, and multiple matching structures disposed around an external surface of the first casing. Each matching structure has a guiding notch, an extending channel, and a positioning channel. The female engaging element has a second casing, a second magnetic element disposed in the second casing, and multiple positioning protrusions respectively corresponding to the multiple matching structures. The positioning protrusions respectively engage in the positioning channels when the first magnetic element and the second magnetic element are magnetically attracted to each other, and will not leave the positioning channels when an external pulling force is applied on the engaging module, and this simultaneously improves the convenience of assembly and the stability after assembly.

10 Claims, 6 Drawing Sheets

ENGAGING MODULE

BACKGROUND OF THE INVENTION

1. Field of the Invention

The present invention relates to an engaging module, and more particularly to an engaging module that can enable two parts of an object to assemble or disassemble.

2. Description of Related Art

When connecting or assembling two opposite ends of a chain object, an engaging module is disposed between the two opposite ends of the chain object. The engaging module has a screwed element and an assembling element. The screwed element has an external thread, and the assembling element has a screwed hole. The screwed element and the assembling element are respectively disposed on the two opposite ends of the object, and the two opposite ends can be disassembled or assembled with each other according to a user's need via the external thread of the screwed element screwed with the screwed hole of the assembling element.

However, when the user connects the two opposite ends of the object, the user needs to align the screwed element with the assembling element to screw the screwed element into the assembling element to connect the two opposite ends of the object, and this is inconvenient for the user to align and assemble the screwed element and the assembling element to connect the two opposite ends of the object.

In order to make the engaging module more convenient in use, at present, a conventional magnetic engaging module has been provided on the market, and the conventional magnetic engaging module has a male magnetic buckle and a female magnetic buckle. The male magnetic buckle and the female magnetic buckle are respectively provided with magnetic units that can attract each other. When the user operates the conventional magnetic engaging module, the user can directly move the male magnetic buckle close to the female magnetic buckle, and the magnetic units in the male magnetic buckle and the female magnetic buckle can be attracted to each other, thereby achieving the purpose of engaging, and this can effectively improve the convenience of alignment and assembly. Although the conventional magnetic engaging module can effectively improve the convenience of alignment and assembly, the male magnetic buckle and the female magnetic buckle of the conventional magnetic engaging module are prone to separate from each other via an external force, so the stability of the conventional magnetic engaging module after assembly is still insufficient.

To overcome the shortcomings, the present invention provides an engaging module to mitigate or obviate the aforementioned problems.

SUMMARY OF THE INVENTION

The main objective of the present invention is to provide an engaging module that can enable two parts of an object to assemble or disassemble.

The engaging module in accordance with the present invention has a male engaging element and a female engaging element. The male engaging element is connected to the female engaging element and has a first casing, a first magnetic element disposed in the first casing, and multiple matching structures disposed around an external surface of the first casing. Each matching structure has a guiding notch, an extending channel, and a positioning channel. The female engaging element has a second casing, a second magnetic element disposed in the second casing, and multiple positioning protrusions respectively corresponding to the multiple matching structures. The positioning protrusions respectively engage in the positioning channels when the first magnetic element and the second magnetic element are magnetically attracted to each other, and will not leave from the positioning channels when an external pulling force is applied on the engaging module, and this simultaneously improves the convenience of assembly and the stability after assembly.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
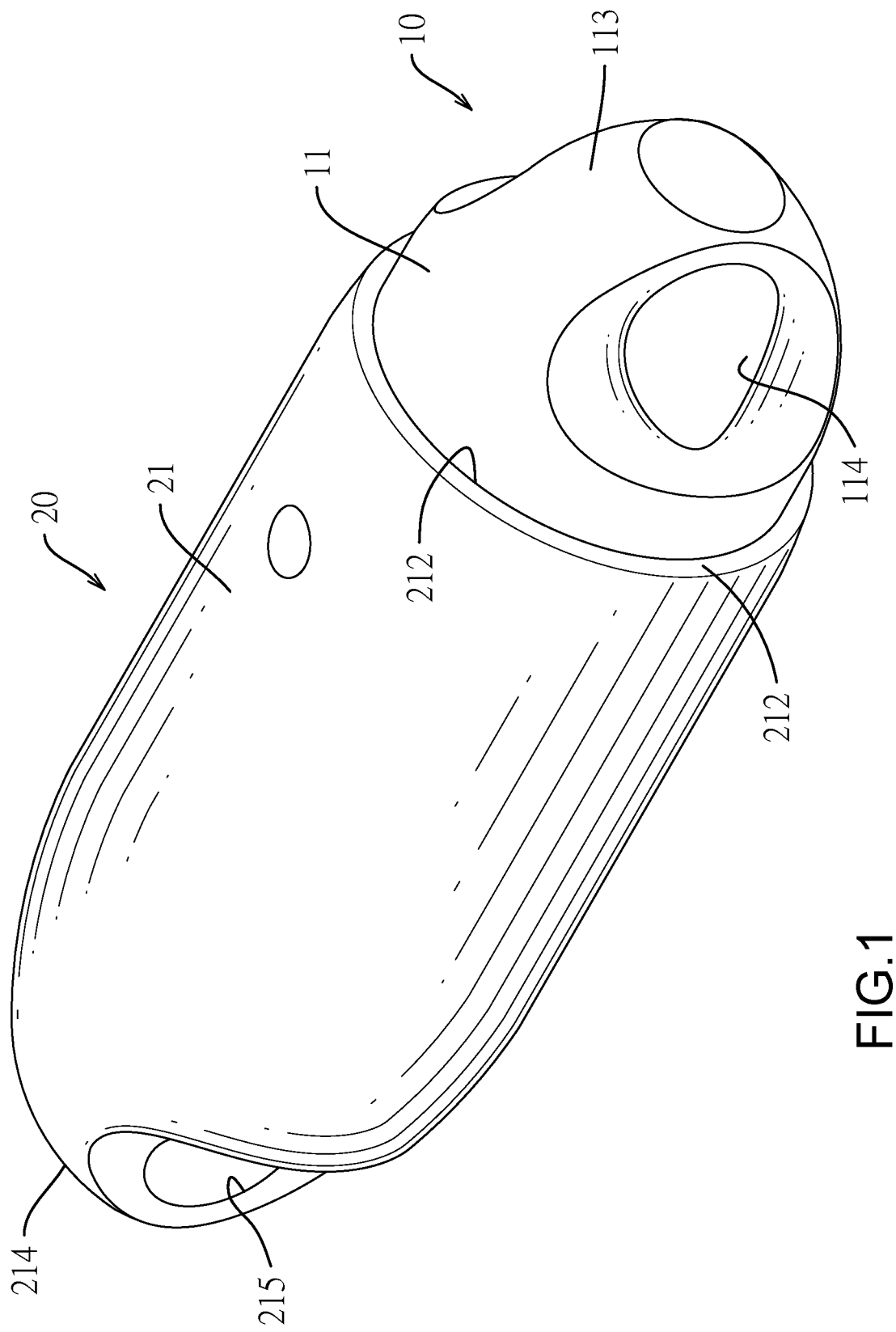
FIG. 1 is a perspective view of an engaging module in accordance with the present invention.
Figure 2:
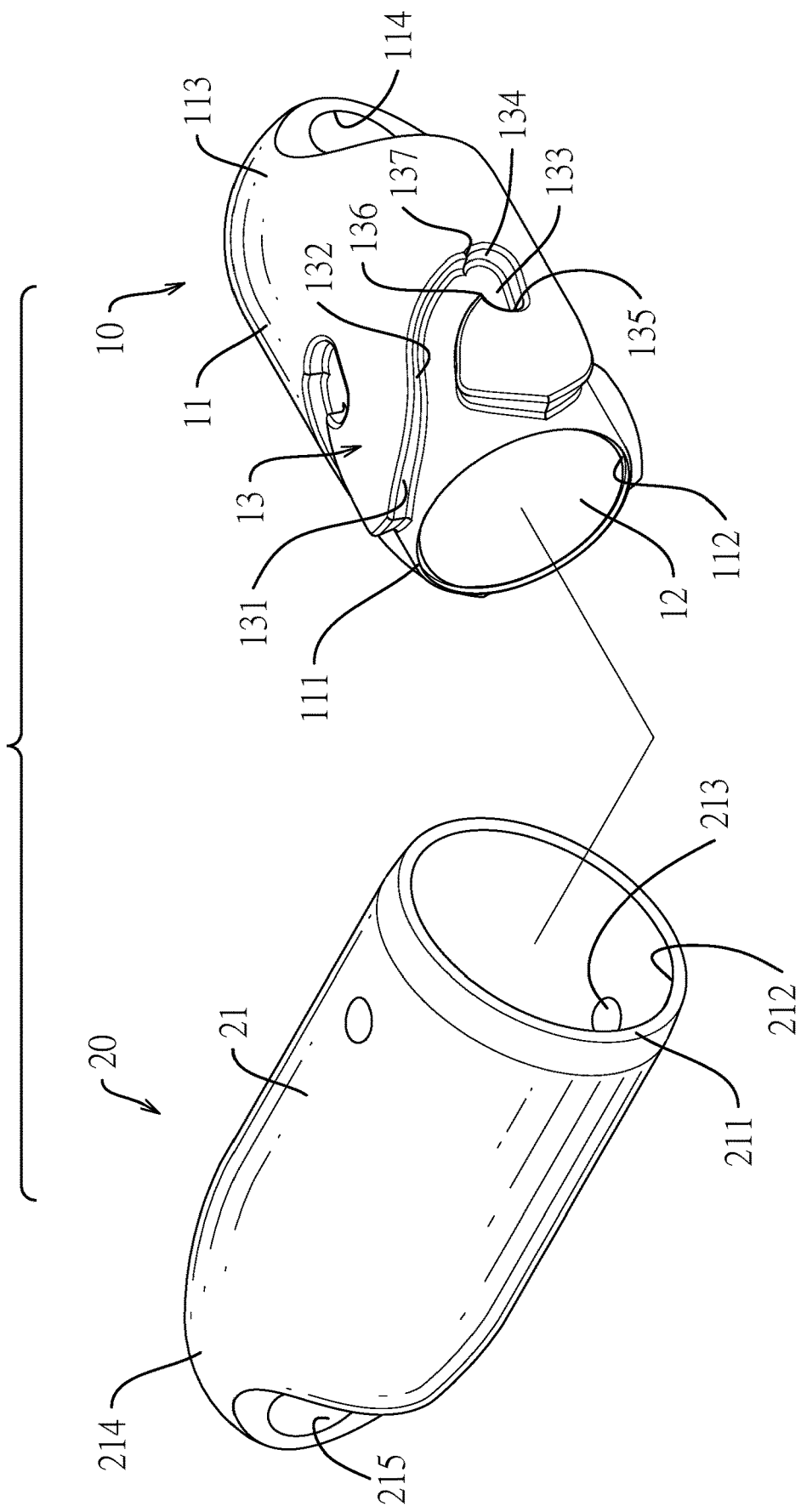
FIG. 2 is an exploded perspective view of the engaging module in FIG. 1.
Figure 3:
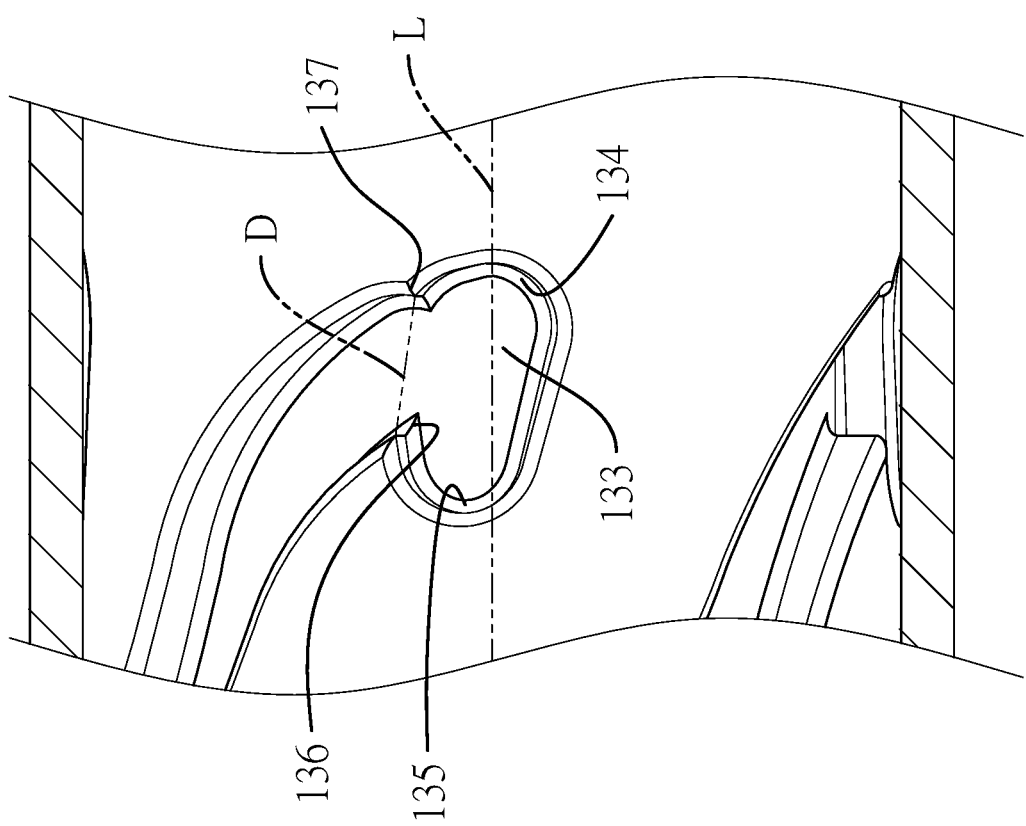
FIG. 3 is an enlarged side view in partial section of the engaging module in FIG. 1.

With reference to FIGS. 1 to 3, an engaging module in accordance with the present invention comprises a male engaging element 10 and a female engaging element 20. The male engaging element 10 is assembled with the female engaging element 20 along an assembling axis L.

With reference to FIGS. 1 to 3, the male engaging element 10 has a first casing 11, a first magnetic element 12, and multiple matching structures 13. The first casing 11 has two ends, an assembling end 111, an assembling hole 112, a connecting end 113, and a first through hole 114. The assembling end 111 is formed on one of the two ends of the first casing 11. The assembling hole 112 is formed in the assembling end 111 of the first casing 11. The connecting end 113 is formed on the other one of the two ends of the first casing 11. The first through hole 114 is formed through the connecting end 113 of the first casing 11. The first magnetic element 12 is disposed in the assembling hole 112 of the first casing 11.

With reference to FIGS. 1 to 3, the multiple matching structures 13 are disposed around an external surface of the first casing 11, and each one of the multiple matching structures 13 has a guiding notch 131, an extending channel 132, a positioning channel 133, a positioning area 134, a limiting area 135, a limiting protrusion 36, and a non-return protrusion 137. The guiding notch 131 may be V-shaped and is formed on the external surface of the first casing 11 adjacent to the assembling end 111 of the first casing 11. The extending channel 132 is formed on the external surface of the first casing 11, communicates with the guiding notch 131, and is obliquely extended toward the connecting end 113 of the first casing 11. The positioning channel 133 is formed on the external surface of the first casing 11, is connected to and communicates with the extending channel 132 opposite to the guiding notch 131, and has two ends.

One of the two ends of the positioning channel 133 extends toward the connecting end 113 of the first casing 11, and the other one of the two ends of the positioning channel 133 extends toward the assembling end 111 of the first casing 11.

With reference to FIGS. 2 and 3, the positioning area 134 is formed on the end of the positioning channel 133 that extends toward the connecting end 113 of the first casing 11. The limiting area 135 is formed on the end of the positioning channel 133 that extends toward the assembling end 111 of the first casing 11, and communicates with the positioning area 134. The guiding notches 131 of the multiple matching structures 13 are connected to and communicate with each other. The limiting protrusion 136 is formed on and protrudes from the external surface of the first casing 11 between the limiting area 135 and the extending channel 132. The non-return protrusion 137 is formed on and protrudes from the external surface of the first casing 11 between the positioning area 134 and the extending channel 132. Furthermore, an imaginary connecting line D is formed between the limiting protrusion 136 and the non-return protrusion 137 and is non-parallel to the assembling axis L.

With reference to FIGS. 1 to 3, the female engaging element 20 has a second casing 21 and a second magnetic element 22. The second casing 21 has two ends, a mounting end 211, a mounting hole 212, multiple positioning protrusions 213, a linking end 214, and a second through hole 215. The mounting end 211 is formed on one of the two ends of the second casing 21. The mounting hole 212 is formed in the mounting end 211 of the second casing 21, and the assembling end 111 of the first casing 11 extends into the second casing 21 via the mounting hole 212. The multiple positioning protrusions 213 are formed on and protrude from an internal surface of the second casing 21 and respectively correspond to the multiple matching structures 13 of the male engaging element 10. The second magnetic element 22 is disposed in the mounting hole 212 of the second casing 21, and can magnetically attract the first magnetic element 12. Then, in operation of the engaging module of the present invention, the multiple positioning protrusions 213 can enter or leave the positioning channels 133 via the guiding notches 131 and the extending channels 132 of the corresponding matching structures 13.

Furthermore, with reference to FIGS. 1 to 3, the linking end 214 is formed on the other one of the two ends of the second casing 21, and the second through hole 215 is formed through the linking end 214 of the second casing 21.

In addition, with reference to FIGS. 2 and 3, a curvature of the extending channel 132 of each matching structure 13 is a brachistochrone curve, and this enables a corresponding positioning protrusion 213 to move into the positioning channel 133 quickly via the extending channel 132.

The engaging module of the present invention can be used to connect two opposite ends of an object, the connecting end 113 of the male engaging element 10 and the linking end 214 of the female engaging element 20 are respectively connected to the two ends of the object, and the two ends of the object are connected to each other to form a loop by connecting the male engaging element 10 with the female engaging element 20.

Figure 4:
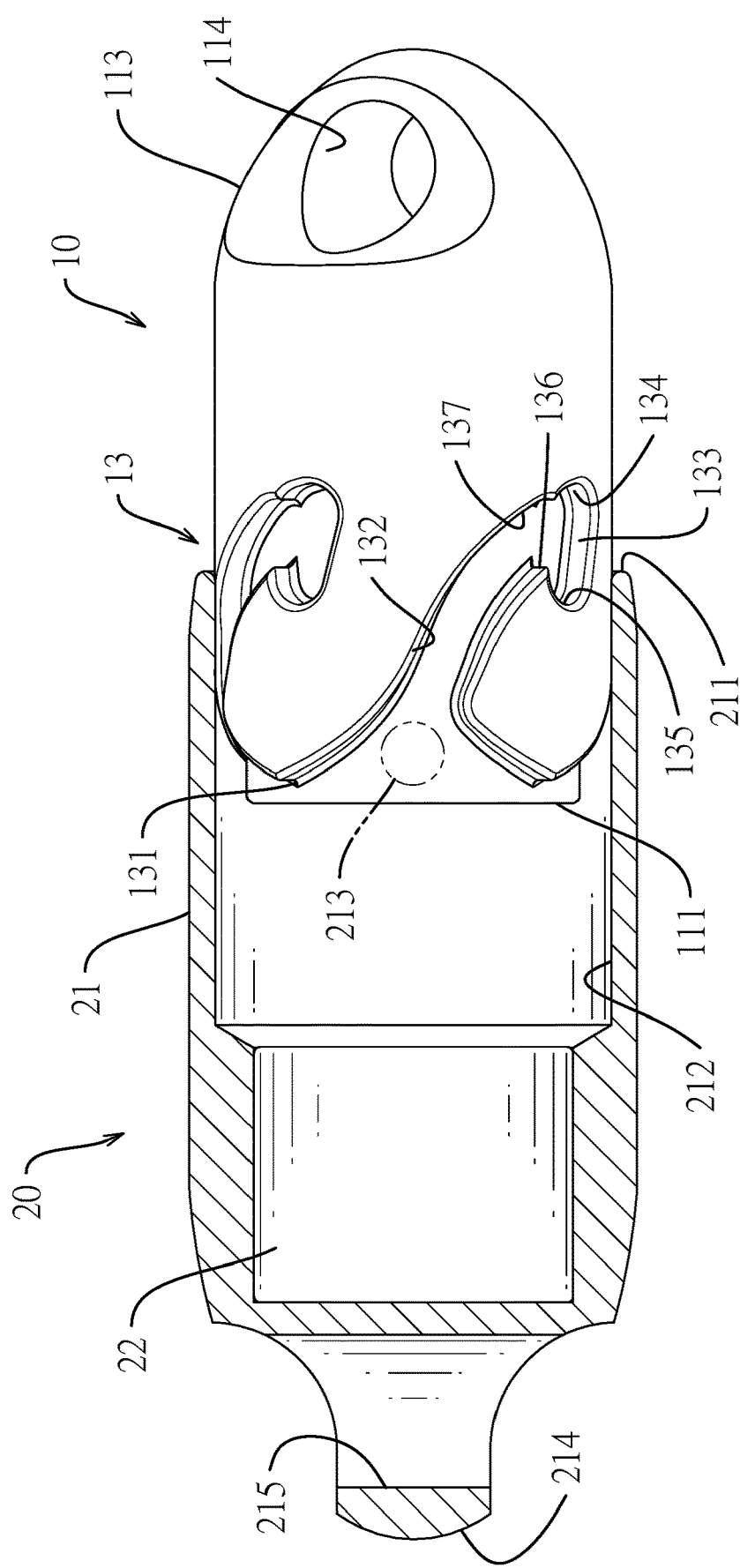
FIGS. 4 and 5 are operational side views in partial sections of the engaging module in FIG. 1.
Figure 5:
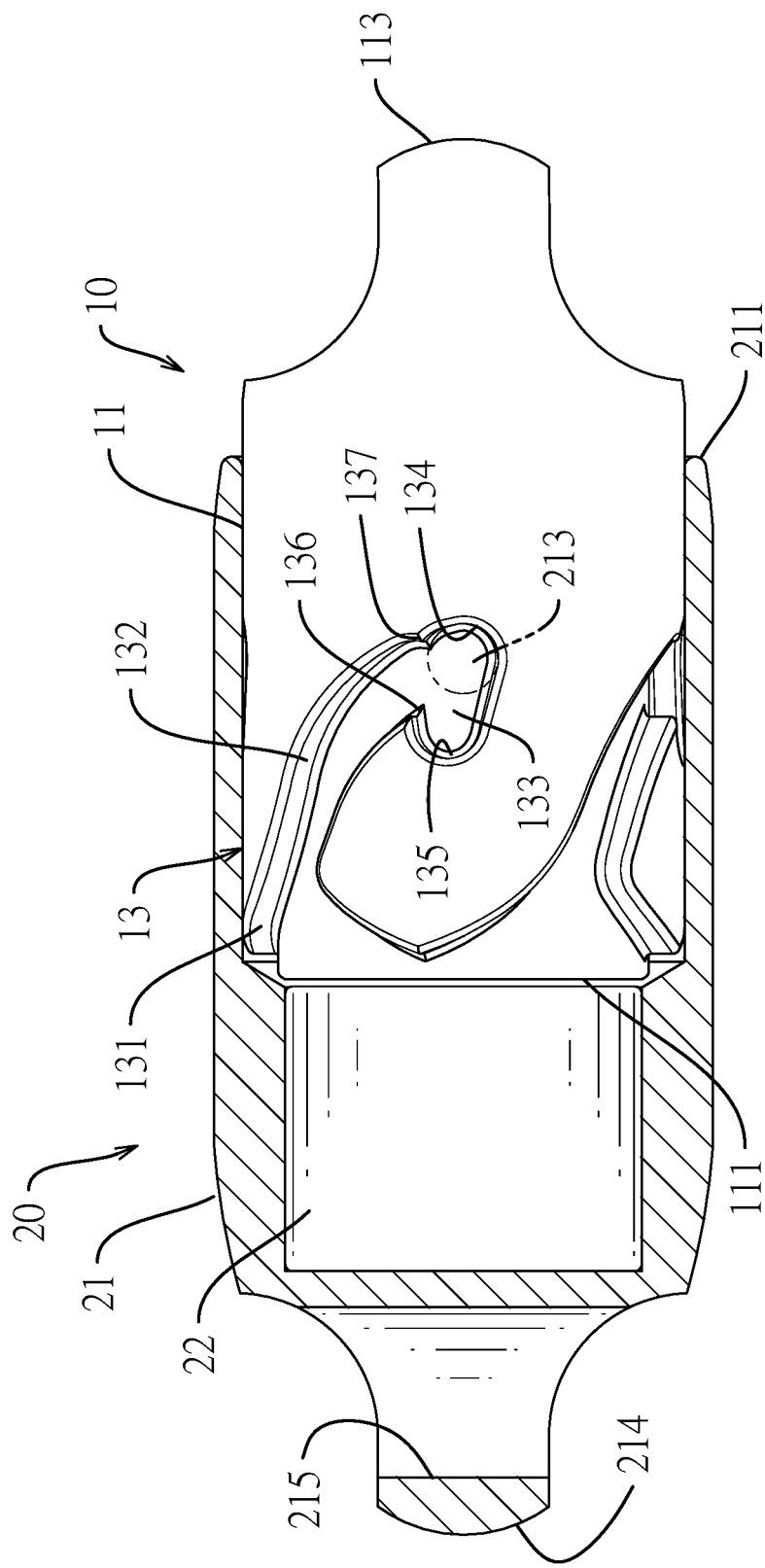

With reference to FIGS. 4 and 5, when the engaging module of the present invention is used by a user, the user moves the mounting end 211 of the female engaging element 20 to the assembling end 11 of the male engaging element 10, and the first magnetic element 12 in the assembling end 111 of the male engaging element 10 is magnetically attracted to the second magnetic element 22 in the mounting hole 212 of the female engaging element 20. Then the assembling end 111 of the male engaging element 10 extends into the mounting hole 212 of the female engaging element 20, and each one of the multiple positioning protrusions 213 moves at the guiding notch 131 of a corresponding matching structure 13 on the external surface of the first casing 11 of the male engaging element 10. In the process of mutual magnetic attraction between the first magnetic element 12 and the second magnetic element 22, the male engaging element 10 and the female engaging element 20 are relatively moved, each one of the multiple positioning protrusions 213 of the second casing 21 of the female engaging element 20 moves in the extending channel 132 via the corresponding guiding notch 131 and further moves into the positioning area 134 of the positioning channel 133 via the corresponding extending channel 132. Therefore, the user can quickly assemble the male engaging element 10 and the female engaging element 20 by magnetic attraction without alignment, and this can effectively improve the convenience of assembly.

Figure 6:
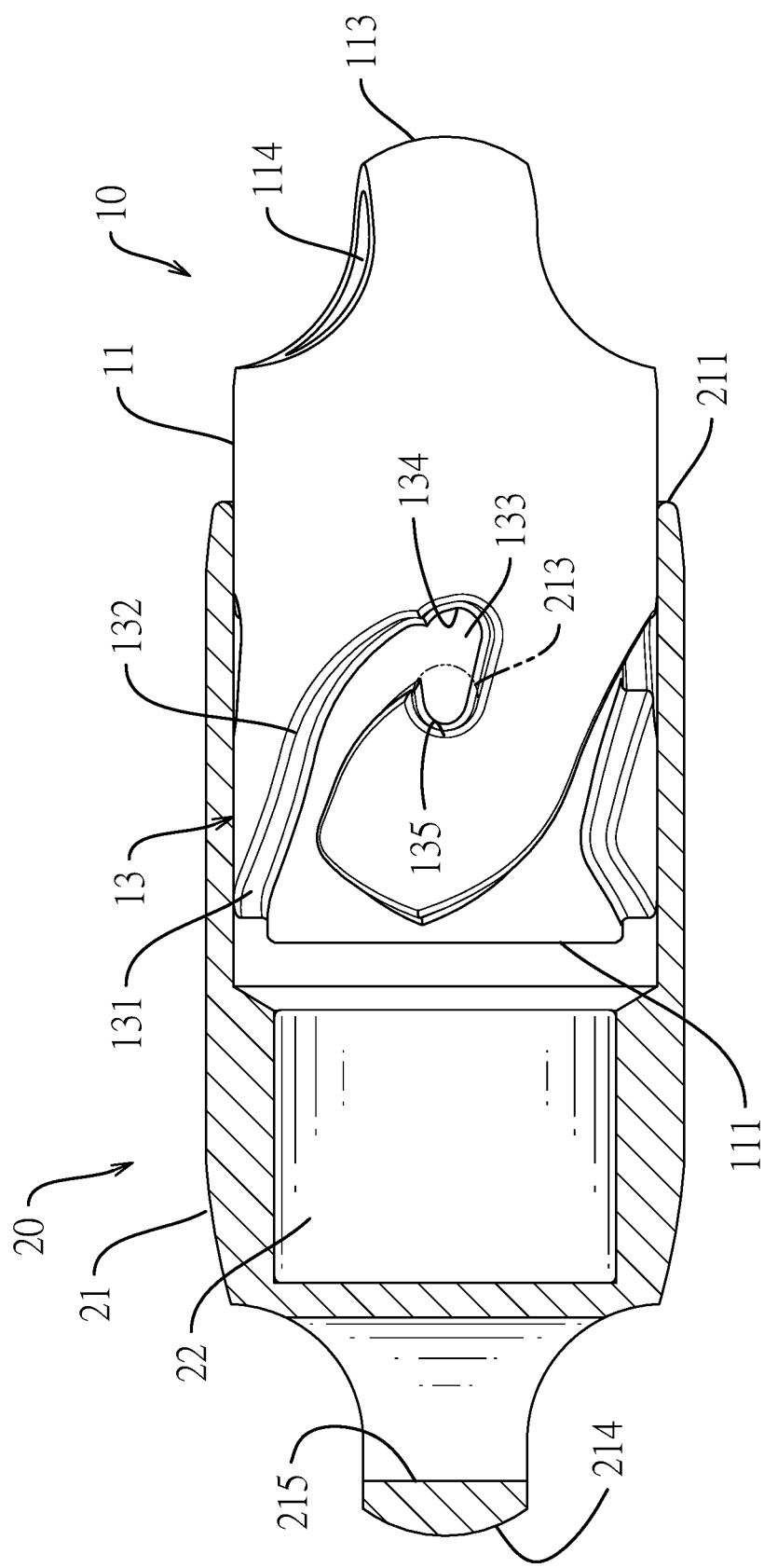
FIG. 6 is an operational side view in partial section of the engaging module in FIG. 1, pulled by an external force.

With reference to FIGS. 5 and 6, when the male engaging element 10 and the female engaging element 20 of the engaging module are assembled, the magnetic attraction between the first magnetic element 12 and the second magnetic element 22 can prevent the male element separating from the female engaging element 20, and each one of the multiple positioning protrusions 213 can be limited in the corresponding positioning channel 133. When the male engaging element 10 and the female engaging element 20 are pulled by an external force, the positioning protrusion 213 can only move from the positioning area 134 to the limiting area 135 under the guidance of the positioning channel 133 without moving out from the extending channel 132. After the external force is removed from the first engaging element 10 and the second engaging element 20, the magnetic force between the first magnetic element 12 and the second magnetic element 22 will make the positioning protrusion 213 return to the positioning area 134 of the corresponding positioning channel 133. Therefore, the male engaging element 10 and the female engaging element 20 will not be completely separated when pulled by an external force and this can effectively improve the stability of assembly.

In addition, with reference to FIGS. 5 and 6, the limiting protrusion 136 of each one of the multiple matching structures 13 can prevent the corresponding positioning protrusion 213 leaving from the corresponding positioning channel 113 when the male engaging element 10 and the female engaging element 20 are pulled by an external force, the non-return protrusion 137 can limit the corresponding positioning protrusion 213 in the positioning area 134 of the corresponding positioning channel 133, and this can prevent the corresponding positioning protrusion 213 sliding out of the extension channel 132 when the male engaging element 10 and the female engaging element 20 of the engaging module are relatively rotated by a torsion force of the object itself.

In summary, the male engaging element 10 and the female engaging element 20 of the engaging module of the present invention can be magnetically attracted to each other by the first magnetic element 12 and the second magnetic element 22, and can avoid separating from each other when pulled by an external force by the structural relationship between each positioning protrusion 213 of the second casing 21 of the female engaging element 20 and a corresponding one of the multiple matching structures 13 of the male engaging element 10. The corresponding positioning protrusion 213 can be buckled into the positioning channel 133 of the corresponding matching structure 13 when the first magnetic element 12 and the second magnetic element 22 are attracted to each other, and will not leave away from the corresponding positioning channel 133 when pulled by an external force, and this can simultaneously improve the convenience of assembly and the stability after assembly.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An engaging module comprising a male engaging element and a female engaging element, and the male engaging element assembled with the female engaging element along an assembling axis, wherein
the male engaging element has
a first casing having
two ends;
an assembling end formed on one of the two ends of the first casing; and
an assembling hole formed in the assembling end of the first casing;
multiple matching structures disposed around an external surface of the first casing, and each one of the multiple matching structures having
a guiding notch being V-shaped and formed on the external surface of the first casing adjacent to the assembling end of the first casing;
an extending channel formed on the external surface of the first casing, communicating with the guiding notch, and obliquely extended away from the assembling end of the first casing;
a positioning channel formed on the external surface of the first casing, connected to and communicating with the extending channel opposite to the guiding notch, and having two ends;
a positioning area formed on one of the two ends of the positioning channel that obliquely extends away from the assembling end of the first casing; and
a limiting area formed on the other one of the two ends of the positioning channel that obliquely extends toward the assembling end of the first casing, and communicating with the positioning area; and
wherein the guiding notches of the multiple matching structures are connected to and communicate with each other;
a first magnetic element disposed in the assembling hole of the first casing; and
the female engaging element has
a second casing having
two ends;
a mounting end formed on one of the two ends of the second casing for the assembling end of the first casing to extend into the second casing;
a mounting hole formed in the mounting end of the second casing; and
multiple positioning protrusions formed on and protruding from an internal surface of the second casing and respectively corresponding to the multiple matching structures of the male engaging element; and
a second magnetic element disposed in the mounting hole of the second casing, and selectively and magnetically attracted to the first magnetic element;
wherein the multiple positioning protrusions respectively enter or leave the positioning channels via the guiding notches and the extending channels of the corresponding matching structures.

2. The engaging module as claimed in claim 1, wherein the first casing has
a connecting end formed on the other one of the two ends of the first casing; and
a first through hole formed through the connecting end of the first casing; and
the second casing has
a linking end formed on the other one of the two ends of the second casing; and
a second through hole formed through the linking end of the second casing.

3. The engaging module as claimed in claim 2, wherein each one of the multiple matching structures has a limiting protrusion formed on and protruding from the external surface of the first casing between the limiting area and the extending channel of the matching structure.

4. The engaging module as claimed in claim 3, wherein each one of the multiple matching structures has a non-return protrusion formed on and protruding from the external surface of the first casing between the positioning area and the extending channel of the matching structure.

5. The engaging module as claimed in claim 4, wherein an imaginary connecting line is formed between the limiting protrusion and the non-return protrusion of each matching structure and is non-parallel to the assembling axis.

6. The engaging module as claimed in claim 2, wherein each one of the multiple matching structures has a non-return protrusion formed on and protruding from the external surface of the first casing between the positioning area and the extending channel of the matching structure.

7. The engaging module as claimed in claim 1, wherein each one of the multiple matching structures has a limiting protrusion formed on and protruding from the external surface of the first casing between the limiting area and the extending channel of the matching structure.

8. The engaging module as claimed in claim 7, wherein each one of the multiple matching structures has a non-return protrusion formed on and protruding from the external surface of the first casing between the positioning area and the extending channel of the matching structure.

9. The engaging module as claimed in claim 8, wherein an imaginary connecting line is formed between the limiting protrusion and the non-return protrusion of each matching structure and is non-parallel to the assembling axis.

10. The engaging module as claimed in claim 1, wherein each one of the multiple matching structures has a non-return protrusion formed on and protruding from the external surface of the first casing between the positioning area and the extending channel of the matching structure.

* * * * *